May 19, 1970  H. VERDIER  3,512,567

TREADS FOR SNOW TIRES

Filed Dec. 22, 1967

INVENTOR.
HENRY VERDIER
BY
Brumbaugh, Free, Graves & Donohue
his ATTORNEYS

United States Patent Office 3,512,567
Patented May 19, 1970

3,512,567
TREADS FOR SNOW TIRES
Henri Verdier, L'Eveque, France, assignor to Compagnie Generale des Etablissements Michelin raison socialle Michelin & Cie, Clermont-Ferrand, Puy-de-Dome, France
Filed Dec. 22, 1967, Ser. No. 692,790
Claims priority, application France, Jan. 2, 1967, 89,732
Int. Cl. B60c *11/08*
U.S. Cl. 152—209                     5 Claims

ABSTRACT OF THE DISCLOSURE

A radial-carcass snow tire has a tread formed at each edge with a plurality of upstanding edge vlocks. The edge blocks are arranged in pairs, the edge blocks of each pair being separated from each other by narrow grooves and from the edge blocks of adjacent pairs by wide grooves. The tread is formed between the edges with a plurality of upstanding center blocks, the center blocks being separated from one another by grooves of medium width. The grooves of medium width form portions of transverse zigzag grooves in one embodiment and longitudinal zigzag grooves in another embodiment. In both embodiments, the zigzag grooves are connected by grooves extending between opposed peaks of adjacent zigzags.

BACKGROUND OF THE INVENTION

The present invention relates to improvements in tire treads and, more particularly, to improvements in the moldings of the tread of radial-carcass type tires intended to be used on snow-covered roads.

It is conventional to provide tires intended to be driven on snow-covered roads with a molding formed of elastomer blocks separated from one another by transverse and longitudinal grooves, the blocks sometimes overlapping one another. In general, uniform moldings are provided over the entire surface of the tread. However, it has been found that uniform distribution of the raised and depressed elements on the edges and in the center of the tread does not provide the best compromise between the contradictory requirements of road traction and resistance to wear and tear, especially in radial-carcass tires with treads rigidified by a metal cord reinforcement.

SUMMARY OF THE INVENTION

An object of the invention is to obtain, by means of a suitable arrangement of the blocks and cut-outs, a better compromise; i.e., to obtain the maximum in grip and resistance to wear and tear.

The foregoing and other objects of the invention are attained in accordance with the invention by the provision of a snow tread formed with raised or upstanding blocks separated from one another and surrounded by deep grooves. At the edges of the tread, there are pairs of blocks—i.e., blocks separated by grooves which are alternatingly narrow and wide, and between the edges of the tread, there are individual blocks—i.e., blocks separated from one another by grooves of medium width.

Preferably, the blocks at the edges of the tread, or part of them, have a larger road-contacting surface than have the blocks in the center of the tread.

The pairing of blocks at the edges provides the advantage that it gives them a compact and massive character while preserving their mobility. Blocks in pairs provide better resistance to wear and tear than individual blocks and afford better traction than a single block of equal surface. Furthermore, they form a more stable support for spikes or nails intended to improve the grip on packed snow or ice. Moreover, the wide grooves separating the groups of two blocks in pairs facilitate both evacuation of melting snow and water and grip on soft snow.

In accordance with one embodiment, the narrow and wide grooves separating the edge blocks are the ends of transverse zigzag grooves connected with one another by grooves formed between opposed peaks of adjacent zig-zags. The transverse zigzag grooves are in remainder formed by the grooves of medium width.

In accordance with another embodiment, the grooves of medium width form longitudinal zigzags, and the narrow and wide grooves separating the edge blocks are lateral offshoots of the longitudinal zigzag grooves. The longitudinal zigzag grooves are connected with one another by grooves formed between opposed peaks of adjacent zigzags. In this embodiment, the overlapping of the blocks is preferably improved by increasing the amplitude of the zigzags from the center towards the edges of the tread or from the center towards one of the tread edges.

BRIEF DESCRIPTION OF THE DRAWING

The invention will be fully understood by reference to the following detailed description of two representative embodiments thereof and the attached drawings, in which.

DESCRIPTION OF THE PREFERRED EMBODIMENTS

Figure 1:
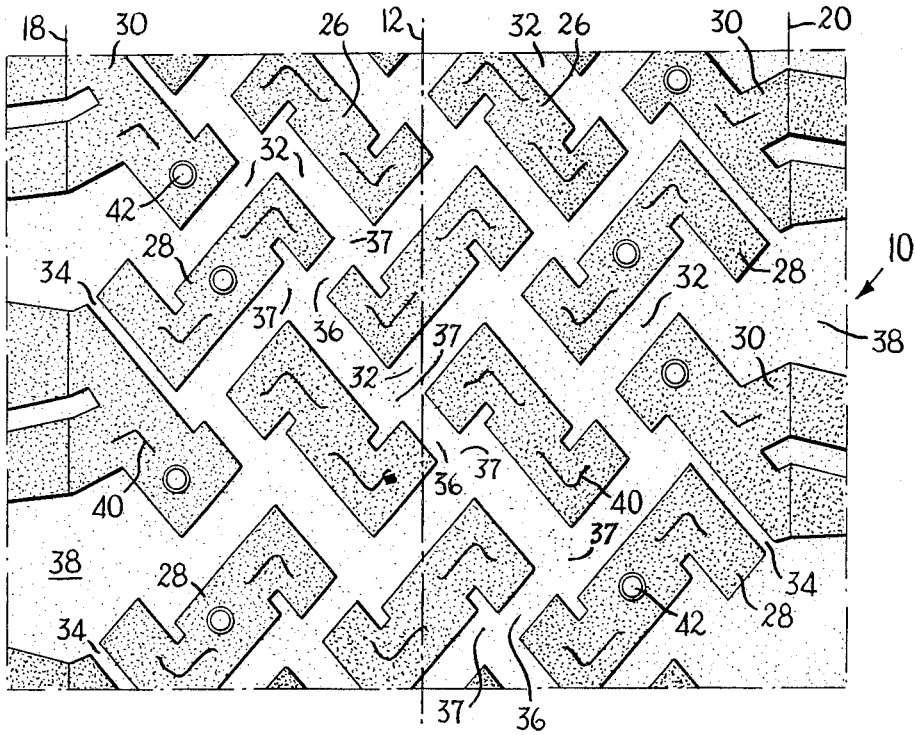
FIG. 1 is a plan view of a circumferential part of a first representative tread showing moldings in accordance with the invention.

In the drawing, heavily stippled parts represent raised or upstanding portions while the grooves are shown lightly stippled. The longitudinal median plane of the tire tread 10 is indicated by a center line 12 (FIG. 1), while the longitudinal median plane of the tire tread 14 is indicated by a center line 16 (FIG. 2). The width of the tread 10 extends from a line 18 to a line 20, while the width of the tread 14 extends from a line 22 to a line 24. Beyond these lines 18, 20, 22, and 24 the sidewalls of the tire begin.

Figure 2:
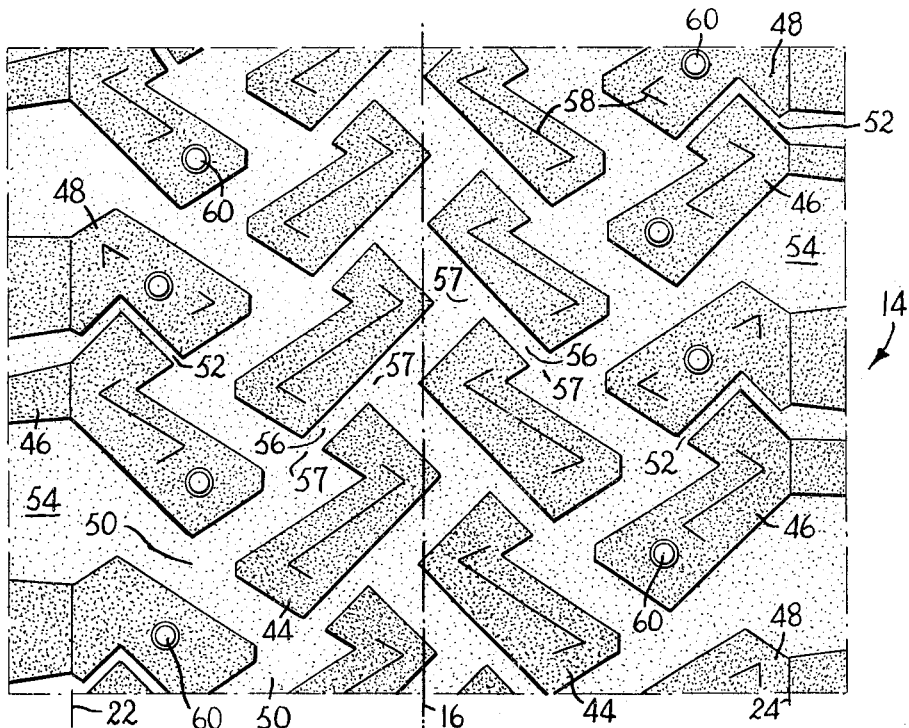
FIG. 2 is a plan view of a circumferential part of a second representative tread showing moldings in accordance with the invention.

The tread in accordance with FIG. 1 comprises raised or upstanding center blocks 26 and lateral or edge blocks 28 and 30. The center blocks 26 are generally S-shaped. They are separated from one another and the edge blocks 28 by the groove 32 the width of which measured perpendicularly to the edges ranges from 6.5 mm. to 9 mm. The edge blocks 28 are generally L-shaped, and the base of the L runs parallel to one of the sides of the edge blocks 30. The latter are generally in the shape of a Y the upper branches of which are at the very edges of the tread. The lateral blocks 28 are separated from the lateral blocks 30 only by a cutout or narrow groove 34 of 2 mm. width; thus they may be considered as paired with the blocks 30. The blocks 28 and the blocks 30 each have a surface larger than that of the center blocks 26.

The transverse grooves 32 and 34 together form zigzags which are recessed and which extend from one edge of the tread to the other and are connected with one another by grooves 36 provided between their respective opposed peaks 37. Each group constituted by the pairing of a block 28 with a block 30 is separated from the following group by a wide groove 38 measuring several centimeters.

All the blocks may be provided with gashes or lamellae 40 for the purpose of increasing adherence on wet roads. Finally, metal studs 42 may be introduced into the blocks, preferably into the edge blocks 28 and 30.

The tread shown in FIG. 2 comprises raised center blocks 44 and edge blocks 46 and 48. The center blocks 44 are generally L-shaped; they are separated from one another and from the lateral blocks 46 and 48 by grooves 50 the width of which measured perpendicularly to the edges thereof ranges from approximately 4 mm. to approximately 8.5 mm. The lateral blocks 46 and 48 resemble in shape the blocks 44, but the surface of each of the former is larger than that of the blocks 44. Each edge block 46 is placed between two edge blocks 48 from which it is separated on one side by a groove 52 of approximately 2 mm. width and on the other side by a groove 54 the width of which is not less than 2 cm. The pairs of blocks consist in this case of one block 46 and one block 48 separated from each other by a groove 52.

The grooves 50 form three zigzag lines in a generally longitudinal direction and are connected with one another by the grooves 56 provided between their respective opposed peaks 57. As in the preceding example, all blocks may be formed with lamellae 58. Metal studs 60 are preferably provided in the edge blocks 46 and 48.

Figure 3:
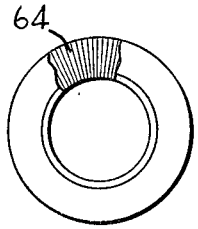
FIG. 3 is an elevational view, partly broken away, of a tire of the radial-carcass type, with which the tread of the invention is especially adapted to be employed.

FIG. 3 shows a tire 62 of the radial-carcass type, with which the tread of the invention is especially adapted to be employed. The tire 62 has radial cords 64 extending from bead to bead and is basically different from bias-carcass tires, which are now being superseded by the radial-carcass tire. Either the tread 10 or the tread 14 may be employed on the tire 62.

Thus there is provided in accordance with the invention a novel and highly-effective snow tire tread particularly adapted for use in tires of the radial-carcass type. The tire tread of the invention provides superior traction on snow and outstanding resistance to wear and tear on dry surfaces. Many modifications within the spirit and scope of the invention of the representative embodiments disclosed herein will readily occur to those skilled in the art. For example, the numerical dimensions disclosed may be varied depending on the size of the tire and other factors, as those skilled in the art are aware. Accordingly, the invention is to be construed as extending to all the modifications thereof within the scope of the appended claims.

I claim:

1. In a snow tire having a radial carcass and a tread, the improvement in which said tread is formed (a) at each edge with a plurality of upstanding edge blocks, said edge blocks being arranged in pairs, the edge blocks of each pair being separated from each other by grooves that are narrow as compared to the minimum width of said edge blocks and from the edge blocks of adjacent pairs by grooves that are wide as compared to the minimum width of said edge blocks and (b) between the edges with a plurality of upstanding center blocks, the center blocks being separated from one another by grooves that are of medium width as compared to the minimum width of said edge blocks.

2. A tire according to claim 1 in which at least some of said edge blocks have road-contacting surfaces larger than the road contacting surfaces of said center blocks.

3. A tire according to claim 1 in which said grooves of medium width form portions of transverse zigzag grooves, the lateral ends of said transverse zigzag grooves being formed by said narrow and wide grooves, said transverse zigzag grooves being disposed with peaks in substantially opposed relationship and adjacent ones of said transverse zigzag grooves being connected by grooves extending between opposed peaks.

4. A tire according to claim 1 in which said grooves of medium width form portion of longitudinal zigzag grooves, said narrow and wide grooves forming lateral offshoots from two of said longitudinal zigzag grooves, said longitudinal zigzag grooves being disposed with peaks in substantially opposed relationship and adjacent ones of said longitudinal zigzag grooves being connected by grooves extending between opposed peaks.

5. A tire according to claim 4 in which the amplitude of the longitudinal zigzag increases in a direction from the center of said tread towards at least one of the edges of said tread.

References Cited

UNITED STATES PATENTS

| | | | |
|---|---|---|---|
| 3,094,157 | 6/1963 | Klohn | 152—209 |
| 3,199,567 | 8/1965 | Kunz et al. | 152—209 |
| 3,376,912 | 4/1968 | Tiborcz | 152—209 |

FOREIGN PATENTS

| | | |
|---|---|---|
| 495,727 | 9/1953 | Canada. |
| 755,137 | 8/1956 | Great Britain. |

ARTHUR L. LA POINT, Primary Examiner